United States Patent [19]
Lee et al.

[11] Patent Number: 5,908,988
[45] Date of Patent: Jun. 1, 1999

[54] OPTICAL VACUUM PRESSURE GAUGE

[75] Inventors: King-Hung Lee; Gwo-Sheng Peng; Der-Chin Su; Ming-Horng Chiu, all of Hsinchu, Taiwan

[73] Assignee: Industrial Technology Research Institute, Hsinchu, Taiwan

[21] Appl. No.: 08/968,011

[22] Filed: Nov. 12, 1997

[30] Foreign Application Priority Data

May 21, 1997 [CN] China .................................. 86107009

[51] Int. Cl.$^6$ ................. G01L 9/00; G01J 1/56; G01J 5/46
[52] U.S. Cl. ........................................ 73/705; 250/231.19
[58] Field of Search ........................ 73/40.5 R, 49.2, 73/705; 250/231.19, 227.16; 359/391, 393

[56] References Cited

U.S. PATENT DOCUMENTS

| | | | |
|---|---|---|---|
| 4,342,907 | 8/1982 | Macedo et al. | 73/705 |
| 4,443,700 | 4/1984 | Macedo et al. | 250/227.16 |
| 4,729,240 | 3/1988 | Sugihara | 73/705 |
| 4,752,141 | 6/1988 | Sun et al. | 73/705 |

OTHER PUBLICATIONS

M. Bom et al., "Principles of Optics," 6$^{th}$ Ed., Pergamon Press, Oxford, U.K., pp. 48–50 (1980). (No month).

A. Wang et al., "Split–spectrum intensity–based optical fiber sensors for measurement of microdisplacement, strain, and pressure," *Applied Optics*, 35(15):2595–2601 (May 20, 1996).

*Primary Examiner*—William Oen
*Attorney, Agent, or Firm*—Merchant, Gould, Smith, Edell, Welter & Schmidt

[57] ABSTRACT

An incident ray is emitted into a vacuum probe manufactured by a transparent material inside a cavity and is totally reflected according to the invention. Based on Fresnel's equation, when an angle of incidence is fixed, the phase difference between a s-polarized light and p-polarized light is a function of two refractive indexes on the both sides of an interface. Therefore, when the refractive index of gas inside the cavity varies with pressure therein, the phase difference between the s-polarized light and p-polarized light can be measured by a total-internal-reflection heterodyne interfermetry. Next, the refractive index of the vacuum cavity can be estimated based on the variation of the phase difference. Then, the pressure inside the cavity is obtained from the measured refractive index of the vacuum cavity cooperating a known pressure contrast list, so that vacuum degree inside the cavity is known.

8 Claims, 2 Drawing Sheets

OPTICAL VACUUM PRESSURE GAUGE

BACKGROUND OF THE INVENTION

1. Field of the invention

The invention relates to a pressure gauge, and in particular to a new optical vacuum pressure gauge.

2. Description of Related Art

Generally, an optical technique is rarely used for a vacuum pressure gauge, but currently, a vacuum system has been combined with an optical system in some areas, such as in a semiconductor industry. When gas inside a vacuum cavity is being vented out, the pressure therein is gradually decreased and the refractive index of the gas is also decreased. If the variation of the refractive index of the gas inside the cavity is accurately measured, then the pressure can be estimated. A total-internal-reflection heterodyne interferometry has the advantages of common path structure, simple setup, easy operation and high precision. Since the total-internal-reflection heterodyne interferometry has a common optical path structure, it cannot be affected by the disturbance from the environment. Furthermore, since it is a phase analyzing approach, it cannot be influenced by the variation of the light intensity, either. As can be know from the above, this approach has characteristics of stability and precision. By use of this approach for measuring the variation of the refractive index of the gas inside the cavity, the required pressure (that is vacuum-degree) can be easily obtained.

The invention is used for measuring the phase of an interference signal, but not for measuring the amplitude or intensity thereof, so the precision of the analysis is higher and it cannot be affected by the variation of the light intensity. In general existing optical pressure gauges, such as the one disclosed in "Split-spectrum intensity-based optical fiber sensor for measurement of microdisplacement, strain, and pressure", Appl. Opt. 35, 2595–2601, (1996) by A. Wang, M. S. Miller, A. J. Plante, M. F. Gunther, K. A. Murphy, and R. O. Claus, deformation caused by pressure difference is mainly measured, wherein the deformation causes light deflection or the change of optical path difference. If the light deflection occurs, the intensity measured on a specific position is also varied. Therefore, the pressure difference can be obtained based on the relationship between the deformation and received intensity. However, since the measured intensity can be influenced by the intensity variation of a light source, a compensation method is needed for modification. In addition, due to limitation of deformation and elastic fatigue, the range of measured pressure is also limited. Furthermore, the pressure difference can also be obtained by measuring the variation of interference fringes based on the variation of the optical path difference. Nevertheless, most general interference approaches do not have common path structures. Therefore, coherence length of laser, disturbance from the environment and precision of analysis must be taken into account when those interference approaches are used for measuring the variation of deformation or refractive index, wherein the disturbance from environment is hard to be overcome.

SUMMARY OF THE INVENTION

In the invention, when a total-internal-reflection heterodyne interferometry (TIRHI) is used for measuring total-internal reflection, the phase difference between s-polarized (in vertical direction) and p-polarized (in horizontal direction) varies with a refractive index on one side of an interface. Referring to "Principles of optics", 6th ed., Pergamon press, Oxford, U.K., pp. 48–50, 1980 by M. Bom and E. Wolf, the relationship between the phase difference and refractive index can be obtained from a Fresnel's equation. When gas inside a vacuum cavity is decreased in a gas-venting process, pressure therein and the refractive index of the gas are also decreased. Based on the relationship between the pressure inside the cavity and the variation of the refractive index and the relationship between the refractive index and phase difference, the pressure value can be is indirectly obtained by measuring the phase difference. Therefore, the pressure can be estimated by means of measuring the variation of the phase caused by the variation of the refraction index during measurement of total internal reflection by use of the TIRHI technique. The advantages of an optical vacuum pressure gauge according to the invention are as follows:

(1) the size of the optical vacuum pressure gauge is small;

(2) the optical vacuum pressure gauge is a stable and precise system;

(3) electronic signals are easily processed;

(4) the optical vacuum pressure gauge is not affected by the variation of the light intensity and the disturbance of other light sources; and (5) the optical vacuum pressure gauge can be used in real-time.

BRIEF DESCRIPTION OF THE DRAWINGS

The invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
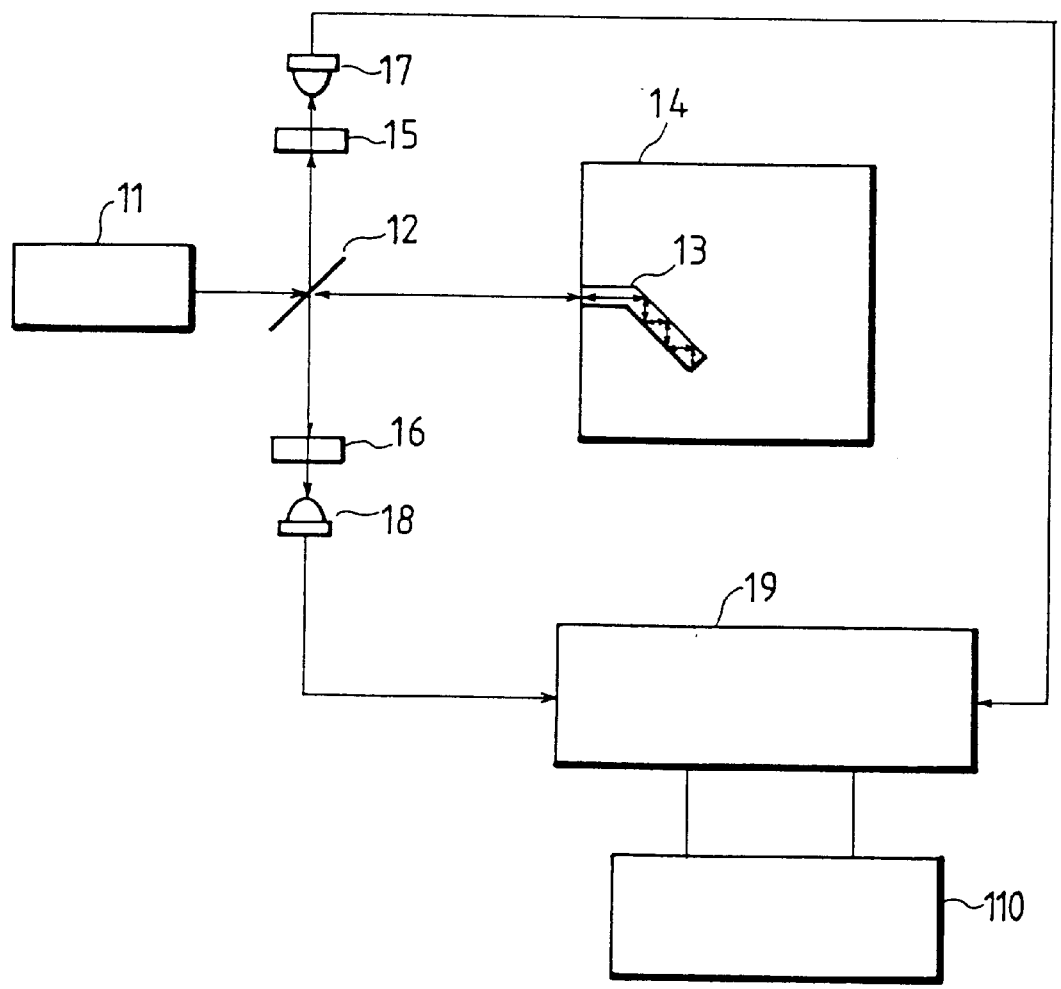
FIG. 1 is a block diagram showing an optical vacuum pressure gauge according to the invention.

Referring to FIG. 1, there is shown an optical vacuum pressure gauge according to an embodiment of the invention, which includes an heterodyne light source 11 having a frequency difference between a s-polarized light (vertical direction) and p-polarized light (horizontal direction), a beam-splitter 12, a vacuum probe 13 and two analyzers 15 and 16, each with transmission axis of 45°, two photodetectors 17 and 18, a phase meter 19, and a personal computer or auto operational hardware 110. In this optical vacuum pressure gauge, an incidence ray is divided into a reflective ray and a penetrating ray by the beam-splitter 12. Then, the reflective ray is detected by the photodetector 17 after pass through the analyzer 15. After that, a signal is obtained and is represented by the following formula:

$$I_r = \frac{1}{2}(1 + \cos(2\pi f t + \Psi)) \quad (1)$$

wherein $\Psi$ represents an initial phase difference between the s-polarized light and p-polarized light, f represents a differential frequency between the s-polarized light and p-polarized light and $I_r$ represents a reference signal. Furthermore, the penetrating ray is totally reflected via the vacuum probe 13 and vacuum cavity 14 and is parallel to the original path to return to the beam-splitter 12. After that, a signal is obtained after it passes through the analyzer 16 and photodetector 18 and this signal is represented by the following formula:

$$I_t = \frac{1}{2}(1 + \cos(2\pi f t + \Psi - \phi)) \quad (2)$$

wherein $I_t$ represents a test signal, $\phi$ represents a phase difference between the s-polarized light and p-polarized light caused by total-internal reflection in the vacuum probe 13. The above-mentioned $I_r$ and $I_t$ are inputted into the phase meter 19 together for comparison in order to obtain the value of $\phi$. The relationship between the $\phi$ value and the refractive index of expected measured dielectric will be described below.

Figure 2:
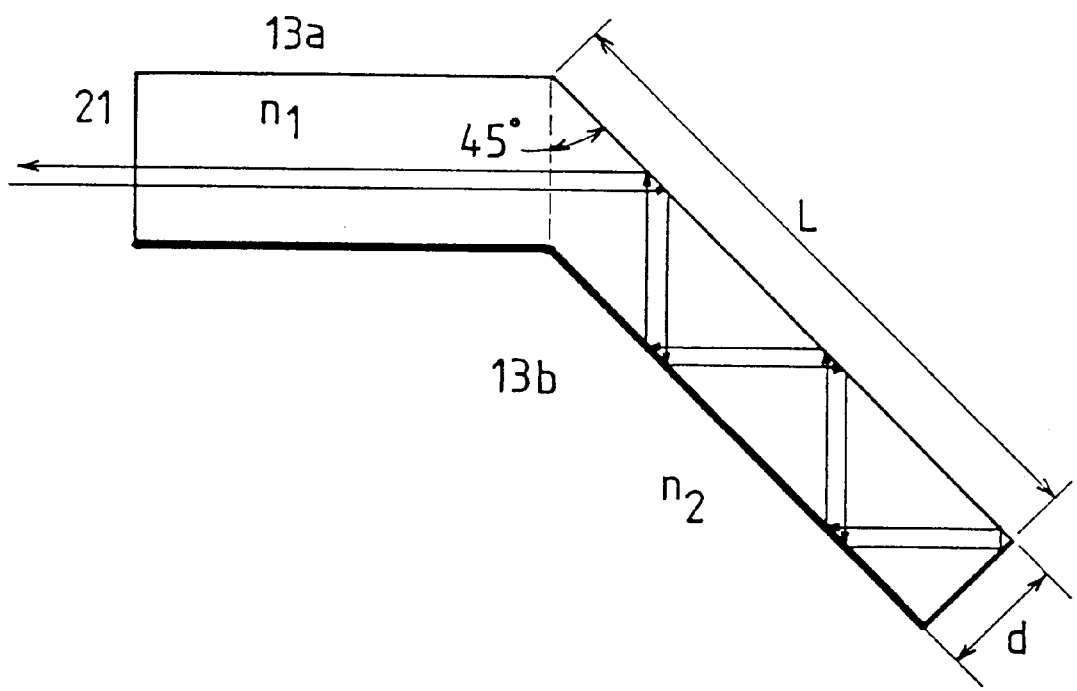
FIG. 2 is a schematic view showing a vacuum probe of FIG. 1.

Referring FIG. 2, a ray is passing inside the vacuum probe 13. The vacuum probe with an folded angle of 45°, having a refractive index of n1, can be divided into two parts 13a and 13b, wherein the part 13b is used to support the part 13a. Since the part 13b is trapezoid-shaped, the ray is totally reflected therein and return to the beam-splitter 12 along the original path as shown in FIG. 1, then received by the analyzer 16 and photodetector 18. Suppose that the gas inside the expected measured cavity has a refractive index of n2. The s-polarized light and p-polarized light is vertically emitted into the vacuum probe 13, so the incidence angle on an interface is 45° as shown in FIG. 2. Therefore, the phase difference between the polarized light and p-polarized light after a first total-internal-reflection is:

$$\phi_1 = 2\tan^{-1}\left[\sqrt{1-2n^2}\right] \quad (3)$$

wherein n=n1/n2 is relative refractive index. Since the vacuum probe 13 is long enough, the number of TIR is a ratio of two times the length L to thickness d. If there are m times of TIR, then the phase difference between the s-polarization and p-polarization is m times that of the first TIR and is shown as formula:

$$\phi = m\phi_1 = 2m\tan^{-1}\left[\sqrt{1-2n^2}\right] \quad (4)$$

It should be noted that the more the number of the TIR is, the more precise the measurement is. The equation (4) can be written as:

$$n_2 = n_1\sqrt{\frac{1-\tan^2(\phi/2m)}{2}} \quad (5)$$

The refractive index n2 is obtained by means of processing the value $\phi$ measured by the phase meter 19 by the personal computer or auto operational hardware 110. Referring to a relation list of refractive index-pressure or a contrast list of phase difference-pressure which is established by means of recording the relationship between pressure and phase difference by a standard pressure gauge during a gas-venting process, the pressure is measured in-time based on the obtained refractive index n2.

The vacuum probe can be designed into other shapes. The main purposes of it are for convenience in use, increasing the number of TIR, and reducing the size of the probe, thereby increasing the precision of measurement. The probe can be further shrunk by use of a thin film technique, fiber technique or integration optical technique.

An optical vacuum pressure gauge according to the invention is characterized in that:

(1) an optical technique is used in the optical vacuum pressure gauge;

(2) the optical vacuum pressure gauge having a common path structure and high precision is suitable for real-time measurement, wherein a TIRHI technique is adopted;

(3) the vacuum probe has the advantages of small size, simple structure, low cost and repeated use without any excessive auxiliary devices;

(4) besides the pressure inside the vacuum cavity is indirectly measured, it can also be used to measure the concentration or refractive index of the gas inside a certain cavity or of the environment;

(5) the range of measured pressure can be in a range of an atmosphere pressure to high-vacuum pressure;

(6) the precision of measurement is related to the number of TIR and the resolution of the phase meter. The more the number of TIR and the higher resolution of the phase meter are, the higher the precision of measurement is.

Although the invention has been disclosed in terms of a preferred embodiment, the disclosure is not intended to limit the invention. Those knowledgeable in the art can make modifications within the scope and spirit of the invention which is determined by the claims below.

What is claimed is:

1. A vacuum pressure gauge for measuring pressure of fluid inside a cavity, comprising:

a heterodyne light source for providing an incident ray, containing two linear polarized lights which are orthogonal and have a frequency difference;

a beam-splitter for dividing said incident ray into a reflective ray and a transmitted ray;

a vacuum probe which includes:
a first part for receiving said transmitted ray; and
a second part which is located in said cavity and has an angle with respect to said first part, for providing a TIR path to allow a TIR testing ray to leave said first part in a direction parallel to said transmitted ray; and a phase meter for comparing said reflective ray which is taken as a reference signal with said TIR testing ray to determine a phase difference between said polarized light, thereby measuring pressure of said fluid inside said cavity.

2. A vacuum pressure gauge as claimed in claim 1, further comprising: a first analyzer for receiving said reflective ray; and a first photodetector which is connected between said first analyzed and said phase meter in order to obtain said reference signal with the following formula:

$$I_r = \frac{1}{2}(1 + \cos(2\pi f t + \Psi))$$

wherein $\Psi$ represents an initial phase difference between two polarized lights in said reflective ray, f represents a frequency difference between said two polarized lights, and t represents time.

3. A vacuum pressure gauge as claimed in claim 1, further comprising:

a second analyzer for receiving said TIR testing ray which is emitted out from said first part and then is reflected by said beam-splitter; and a second photodetector which is coupled between said second analyzer and said phase meter in order to obtain a signal with the following formula:

$$I_t = \frac{1}{2}(1 + \cos(2\pi ft + \Psi - \phi))$$

wherein $\Psi$ represents an initial phase difference between two polarized lights in said reflective ray, f represents the frequency difference of said two polarized lights, t represents time, and $\phi$ represents a phase difference between said two polarized lights in said TIR testing ray.

4. A vacuum pressure gauge as claimed in claim 1, wherein the variation of the refractive index of said fluid inside side cavity is estimated based on Fresnel's equation by said phase difference determined by said phase meter.

5. A vacuum pressure gauge as claimed in claim 1, wherein there is an included angle of 45° between said first part and said second part.

6. A vacuum pressure gauge as claimed in claim 2, wherein the refractive index n2 of said fluid is represented by the following formula:

$$n_2 = n_1 \sqrt{\frac{1 - \tan^2(\phi/2m)}{2}}$$

wherein n1 represents the refractive index of said first part of said vacuum probe, and m represents the number of TIR of said transmitted ray in a path defined by said second part, wherein m is a nature number.

7. A vacuum pressure gauge as claimed in claim 1 wherein the pressure of said fluid inside said cavity is obtained from said refractive index cooperating a relation list of refractive index-pressure, wherein said relation list of refractive index-pressure is established by means of recording the relationship between pressure and phase difference by use of a standard pressure gauge during a gas-venting process.

8. A vacuum pressure gauge as claimed in claim 1 wherein a further included device is connected to said phase meter for calculating the refractive index n2 of said fluid inside said cavity.

* * * * *